United States Patent [19]

Takahashi et al.

[11] Patent Number: 4,527,200
[45] Date of Patent: Jul. 2, 1985

[54] SOLID STATE IMAGING DEVICE

[75] Inventors: Kenji Takahashi, Kodaira; Shusaku Nagahara, Hachioji; Naoki Ozawa, Kokubunji; Koji Kudo, Hachioji; Chikafusa Hirano, Tama, all of Japan

[73] Assignees: Hitachi, Ltd.; Hitachi Denshi Kabushiki Kaisha Corp., both of Tokyo, Japan

[21] Appl. No.: 462,764

[22] Filed: Feb. 1, 1983

[30] Foreign Application Priority Data

Feb. 10, 1982 [JP] Japan ................................. 57-18793

[51] Int. Cl.³ ............................................. H04N 3/14
[52] U.S. Cl. ..................................... 358/213; 358/209
[58] Field of Search ................ 358/209, 212, 213, 41; 250/578; 357/24 LR

[56] References Cited

U.S. PATENT DOCUMENTS

| | | | |
|---|---|---|---|
| 3,772,457 | 11/1973 | Macovski | 358/209 |
| 4,212,034 | 7/1980 | Kokie et al. | 358/213 |
| 4,216,498 | 8/1980 | Evans | 358/93 |
| 4,292,653 | 9/1981 | Bock et al. | 358/140 |
| 4,314,279 | 2/1982 | Yoshida | 358/212 |
| 4,315,284 | 2/1982 | Stillwell et al. | 358/209 |
| 4,336,556 | 6/1982 | Sekine et al. | 358/213 |
| 4,336,557 | 6/1982 | Koch | 358/213 |
| 4,380,755 | 4/1983 | Enolicher | 382/68 |

Primary Examiner—Gene Z. Rubinson
Assistant Examiner—Robert Lev
Attorney, Agent, or Firm—Antonelli, Terry & Wands

[57] ABSTRACT

In a solid state imaging device in which two signals on two horizontal scanning lines are read out simultaneously for easy image enhancement, the two signals read from the two horizontal scanning lines are subtracted from each other while they are added together, and the difference signal is added to the sum signal so as to produce a video signal subject to the image enhancement. As a solid state image sensor, a MOS type image sensor as well as a CCD, CID or CC type image sensor may be used.

4 Claims, 6 Drawing Figures

F I G. 1
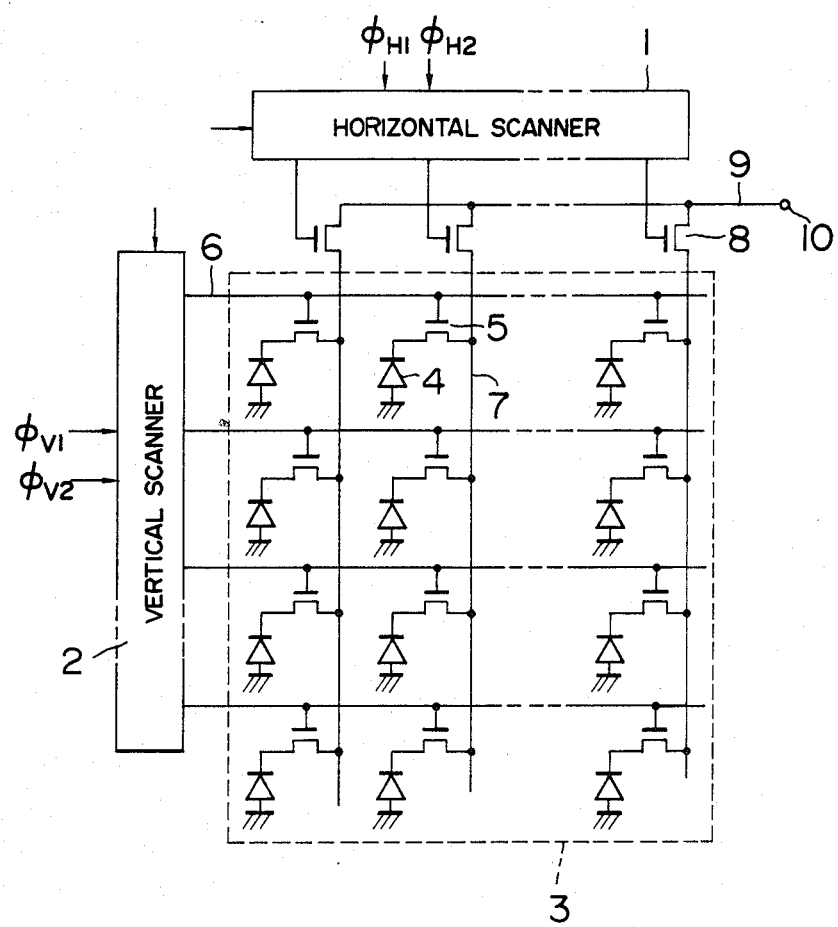

SOLID STATE IMAGING DEVICE

BACKGROUND OF THE INVENTION

This invention relates to a signal processing circuit for a solid state imaging device.

Generally, as shown in FIG. 1, a solid state imaging device comprises a horizontal scanner 1 for X position selection, a vertical scanner 2 for Y position selection, and a photosensor array 3 of photodiodes 4 and MOS transistors 5. The MOS transistor 5 constitutes a vertical switch responsive to a vertical scanning pulse which is read out to a signal line 6. The drains of the vertical switches arrayed in Y direction are connected in common to a vertical signal output line 7 which in turn is connected to an output signal line 9 through a MOS transistor 8 serving as a horizontal switch responsive to a horizontal scanning pulse. Accordingly, signals from the photodiodes in two-dimensional matrix are sequentially read out to a output terminal 10 when the switches 5 and 8 are sequentially activated by the pulses delivered out of the horizontal and vertical scanners 1 and 2.

The read-out signal is usually amplified by a pre-amplifier and useless components such as clock signals are eliminated by a low-pass filter so as to produce a video signal.

The signal processing by the pre-amplifier and the low-pass filter is not related to the present invention essentially and will not be described herein.

Generally, in a solid state image sensor and in a camera with a pick-up tube as well, image enhancement is adopted to improve picture sharpness. By this, deterioration of the full frequency response over the entire camera inclusive of an imaging device can be corrected. Typically, in a television camera, the image enhancement is carried out independently in the horizontal and vertical directions. FIG. 2a shows, in block form, a typical image enhancement circuit and FIG. 2b shows signal waveforms appearing in the circuit. For explanation, the image enhancement in the horizontal direction will first be described. A video signal 22 produced from an image sensor 21 during one horizontal period branches off and one of three components is applied to a delay circuit 23. The delay circuit 23 has a delay time which depends on a boost frequency. For a boost frequency of 4 MHz, the delay time may preferably be 125 nS. An output signal 24 from the delay circuit 23 is subtracted by a signal component not passed through the delay circuit at a subtractor 25. An output signal 26 from the subtractor 25 has only leading and trailing horizontal edge portions of the horizontal input video signal. The edge signal 26 is set to a suitable level at a signal level setting device 27 and added with the input signal 22 at an adder 28. With the circuit constructed as above, a video signal 29 whose horizontal edge portions are enhanced can be obtained. The image enhancement in the vertical direction may be accomplished on the basis of the same principle as that of the horizontal image enhancement described previously. More particularly, for the vertical image enhancement, a circuit for delaying the image signal by one horizontal scanning period (about 63.5 μS), hereinafter referred to as a 1 HDL circuit, is used as a delay line. With reference to FIG. 3, it is now assumed that a window pattern 31 on a picture screen is imaged. The window pattern is sampled by the scanning line in the vertical direction and a video signal as shown at section (a) in FIG. 3 is produced. The video signal is passed through the 1 HDL circuit and a signal as shown at section (b) in FIG. 3 is obtained. Then, the original input signal at (a) is subtracted by the output signal at (b) of the 1 HDL circuit and a signal as shown at section (c) in FIG. 3 is obtained. Obviously, the signal at (c) represents a vertical edge signal. In this manner, the vertical image enhancement can be accomplished by replacing the delay circuit with the 1 HDL circuit in the circuit arrangement of FIG. 2. Generally, for the 1 HDL circuit participating in the vertical image enhancement, a crystal delay line (so-called glass delay line) utilizing the propagation time of a crystal or a charge transfer device such as CCD is used.

FIG. 4 shows a 1 HDL circuit utilizing a glass delay line. The glass delay line is based on propagation delay time within glass 44, as described above. Accordingly, when the glass delay line is driven by a transducer 43 for converting an electrical signal into an ultrasonic wave, the ultrasonic wave is delayed and converted into an electrical signal by an acoustoelectric transducer 45. A piezo-electric transducer is typically used as the transducer 45.

With the ultrasonic delay line, the signal must be modulated with a high frequency and applied to the delay line. Accordingly, there needs a modulator 41, an actuator 42 and a carrier wave oscillator 49. Since an output signal from the transducer 45 is terribly attenuated, an amplifier 46 is also provided. An amplified signal is detected by a detector 47, eliminated of the useless carrier-signal by a low-pass filter 48, and restored to a base band signal. The conventional image enhancement circuit using the glass delay line as the 1 HDL circuit requires a great number of parts as described above and is expensive.

When a CCD is employed, a clock driver for driving the CCD is necessary and this circuit must actuate an electrode capacitance of usually several of hundreds of pF at a frequency of approximately ten MHz, resulting in a large-scale circuit and great power consumption. In addition, low-pass filters must be provided for input and output sides and the CCD per se is expensive. Consequently, the image enhancement circuit with the CCD also suffers from high cost like the image enhancement circuit with the glass delay line.

SUMMARY OF THE INVENTION

The present invention considers the manner of reading signals from the image sensor in an attempt to eliminate the conventional drawbacks and has for its object to provide a circuit arrangement for a solid state imaging device capable of producing a vertical image enhancement signal without resort to the 1 HDL circuit.

To this end, according to the invention, in a solid state imaging device comprising a solid state image sensor with a plurality of photosensors disposed in two-dimensional matrix whereby signals from two horizontal scanning lines for the solid state image sensor are read out simultaneously, there are provided an adder circuit for adding the two-line signals, and a subtractor circuit for subtracting one of the two-line signals from the other, an output signal from the adder circuit being added with an output signal from the subtractor circuit to produce a video signal.

BRIEF DESCRIPTION OF THE DRAWINGS

FIG. 1 is a connection diagram showing a typical solid state imaging device;

FIG. 2b shows waveforms useful in explaining the operation of the circuit shown in FIG. 2a;

DESCRIPTION OF THE PREFERRED EMBODIMENT

Figure 5:
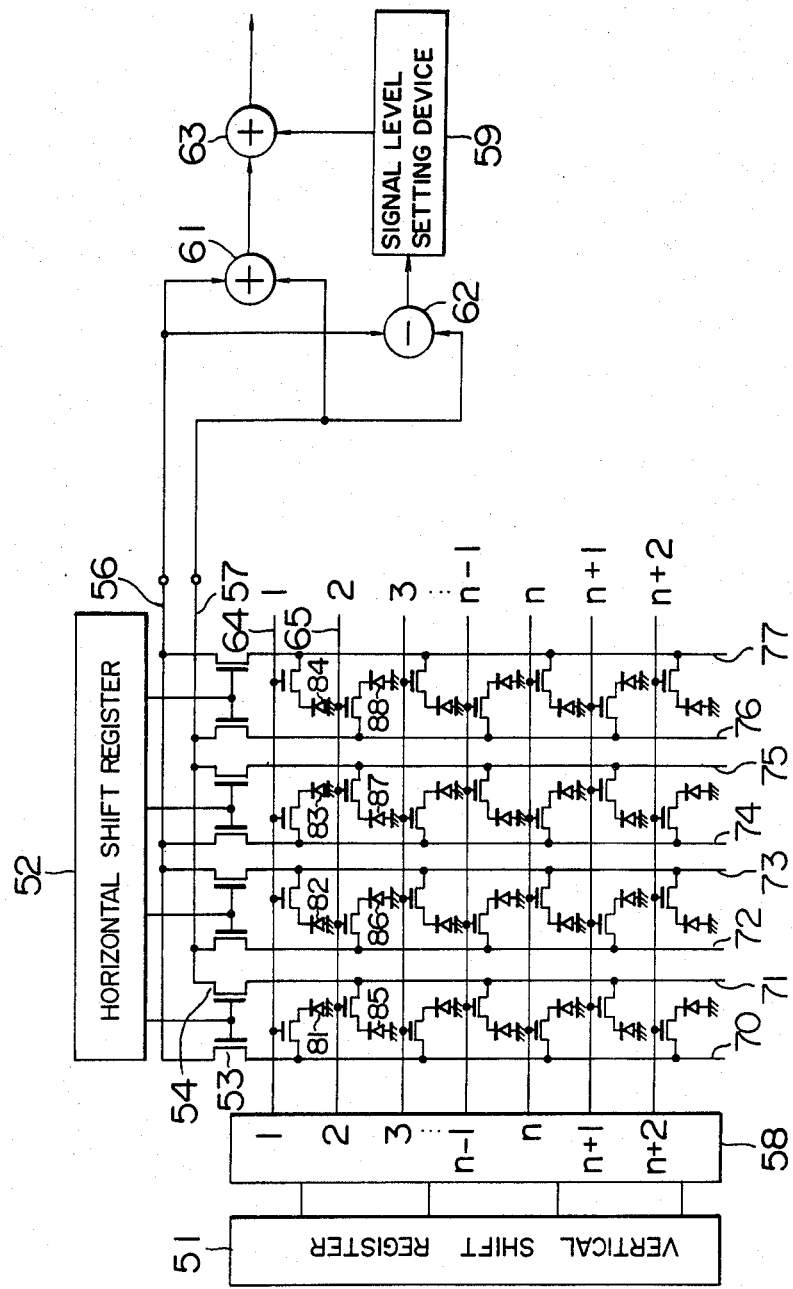
FIG. 5 is a connection diagram showing a solid state imaging device embodying the invention.

In a preferred embodiment of the invention as shown in FIG. 5, signals from two horizontal scanning lines for a solid state image sensor are read out simultaneously. In particular, it is now assumed that first and second horizontal scanning lines are read simultaneously. Then, a first output pulse of a vertical shift register 51 is applied simultaneously to first and second vertical pulse lines 64 and 65 through a horizontal scanning line selector circuit 58. A signal of photodiodes 81–84 corresponding to the first horizontal scanning line and a signal of photodiodes 85–88 corresponding to the second horizontal scanning line are transferred simultaneously to the separate vertical lines 70 and 71, 72 and 73, ..., 76 and 77. When an output signal from a horizontal shift register 52 is applied simultaneously to horizontal switching transistors 53 and 54, the signals on the first and second horizontal scanning lines are led to separate horizontal signal lines 56 and 57 through the vertical lines 70 and 71. In a similar manner, third and fourth horizontal scanning lines, ..., n-th and (n+1)-th horizontal scanning lines are read simultaneously.

Generally, in the standard system, the 2:1 interlace scanning is employed and in order to make the arrangement of FIG. 5 compatible with the standard system, there needs 525 scanning lines. According to the 2:1 interlace scanning, one out of two scanning lines is jumped to read about 262 scanning lines in a first field and the remaining 262 scanning lines are read in a second field.

Since in the arrangement of FIG. 5 two horizontal scanning lines are read simultaneously, the entire 525 horizontal scanning lines are read in a first field and in the following second field, the horizontal scanning line selector circuit 58 is switched to change the combination of two vertical pulse lines to be selected. Namely, second and third vertical pulse lines, ..., (n−1)-th and n-th vertical pulse lines, (n+1)-th and (n+2) vertical pulse lines ... are combined, respectively. Signals read out simultaneously to the separate horizontal signal lines are of course added at the adder 61 to produce a video signal.

Figure 2A:
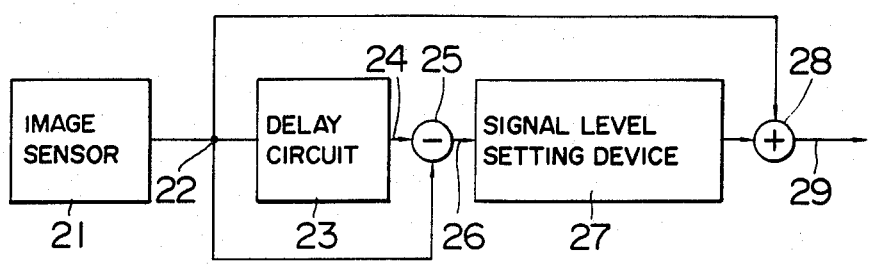
FIG. 2a is a block diagram showing a prior art image enhancement circuit.
Figure 2B:
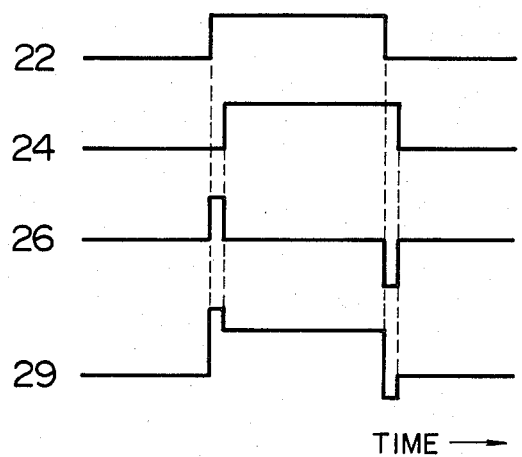
Figure 3:
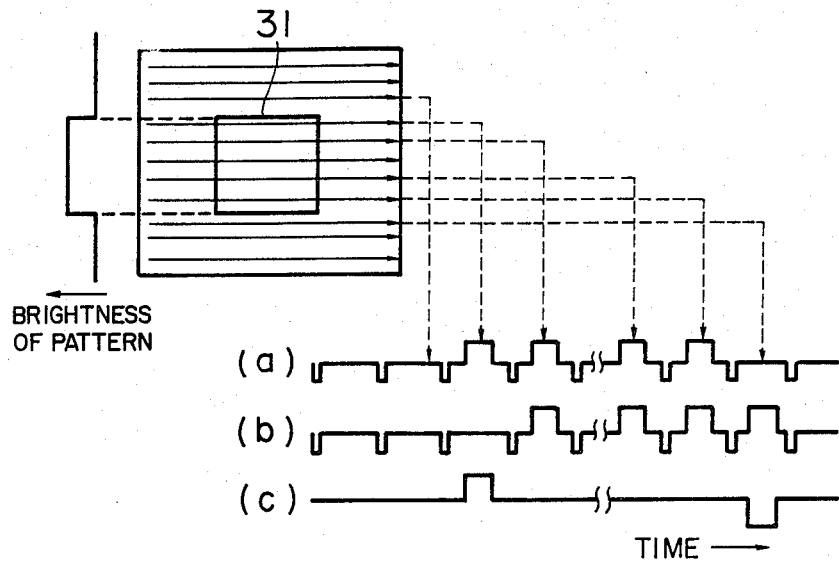
FIG. 3 is a diagram illustrative of signals occurring in the vertical image enhancement.
Figure 4:
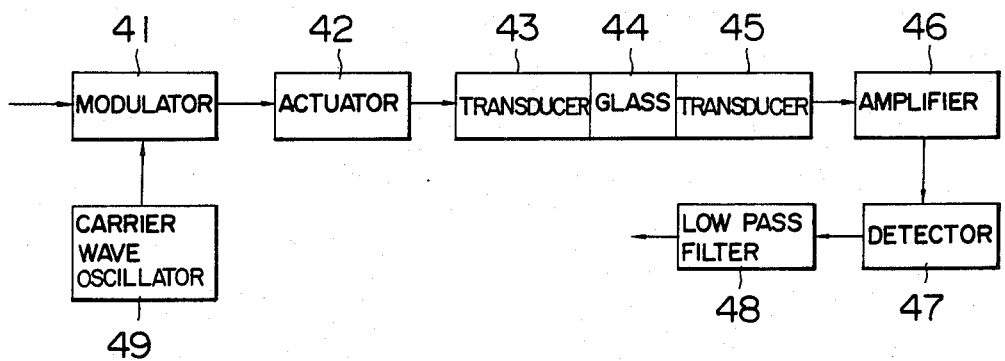
FIG. 4 is a block diagram showing a prior art 1 HDL circuit.

With the above construction, the centroid position of an image projected on the solid state image sensor, i.e., an image constructed by the mean values of the respective two-line signals can be shifted so that the same effect as that obtained with the typical interlace scanning can be obtained without causing any inconvenience. Thus, with the solid state imaging device of FIG. 5, one signal on one horizontal scanning line and the other signal on the other following horizontal scanning line can be read out simultaneously. Consequently, the image enhancement in the vertical direction can be accomplished without resort to the 1 HDL circuit described previously. For extraction of the image enhancement signal, a circuit similar to FIG. 2 may be adopted. The difference between the two signals read out simultaneously is detected at the subtractor 62 and added to the sum from the adder 61 at the adder 63. The level of the image enhancement signals to be added is adjusted by the signal level setting device 59 as described previously.

As has been described, according to the invention, the vertical image enhancement can readily be accomplished without resort to the prior art expensive 1 HDL circuit and a solid state television camera of high quality can advantageously be manufactured at a low cost.

In FIG. 5, circuit elements not directly related to the present invention (pre-amplifier and low-pass filter) are not illustrated.

It should be understood that the present invention may obviously be applicable to a solid state imaging device using a solid state image sensor other than the MOS type image sensor of the foregoing embodiment. For example, a solid state image sensor using a charge transfer device such as CCD, or a CID type solid state image sensor may substitute for the combination of the horizontal shift register 52 and horizontal switches 53 and 54.

We claim:

1. A solid state imaging device comprising a solid state image sensor with a plurality of photosensors disposed in two-dimensional matrix whereby signals from two horizontal scanning lines for the solid state image sensor are read out simultaneously, an adder circuit for adding the two-line signals, and a subtractor circuit for subtracting one of the two-line signals from the other, an output signal from the adder circuit being added with an output signal from the subtractor circuit to produce a video signal.

2. A solid state imaging device according to claim 1 further comprising a signal level setting device for adjusting the level of the output signal from said subtractor circuit for addition with the output signal from said adder circuit.

3. A solid state imaging device according to claim 1 wherein said solid state image sensor comprises a MOS type image sensor.

4. A solid state imaging device according to claim 1 wherein said solid state image sensor comprises a solid state image sensor using a CCD or a CID type image sensor.

* * * * *